(12) United States Patent
Park et al.

(10) Patent No.: US 6,883,339 B2
(45) Date of Patent: Apr. 26, 2005

(54) METHOD FOR CONTROLLING POWER SAVING OPERATION OF REFRIGERATOR WITH TWO EVAPORATOR

(75) Inventors: Jin Koo Park, Kyonggi-do (KR); Yang Kyu Kim, Seoul (KR); Se Young Kim, Seoul (KR); Yin Young Hwang, Kyonggi-do (KR); Joon Hyung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 23 days.

(21) Appl. No.: 10/114,109

(22) Filed: Apr. 3, 2002

(65) Prior Publication Data

US 2002/0144510 A1 Oct. 10, 2002

(30) Foreign Application Priority Data

Apr. 4, 2001 (KR) .................................. P2001-17950
Apr. 4, 2001 (KR) .................................. P2001-17951
Apr. 4, 2001 (KR) .................................. P2001-17952
May 8, 2001 (KR) .................................. P2001-24877

(51) Int. Cl.$^7$ ............................................. F25D 17/06
(52) U.S. Cl. ............................. 62/180; 62/231; 62/186
(58) Field of Search ........................... 62/231, 180, 187, 62/183, 199, 186, 157, 158

(56) References Cited

U.S. PATENT DOCUMENTS

| 4,136,730 | A | * | 1/1979 | Kinsey ..................... 62/231 X |
| 4,750,672 | A | * | 6/1988 | Beckey et al. ............ 62/180 X |
| 5,918,474 | A | * | 7/1999 | Khanpara et al. ............. 62/179 |
| 6,182,455 | B1 | * | 2/2001 | Kikuyama .................... 62/181 |

* cited by examiner

Primary Examiner—Harry B. Tanner
(74) Attorney, Agent, or Firm—Fleshner & Kim, LLP

(57) ABSTRACT

A method for reducing power consumption of a refrigerator and improving a refrigerating efficiency is provided. This method controls a power saving operation of a refrigerator with two evaporators by either extending or delaying operation of at least one of, or a combination of, a freezer chamber evaporator fan, a refrigerating chamber evaporator fan, or a condenser fan.

24 Claims, 11 Drawing Sheets

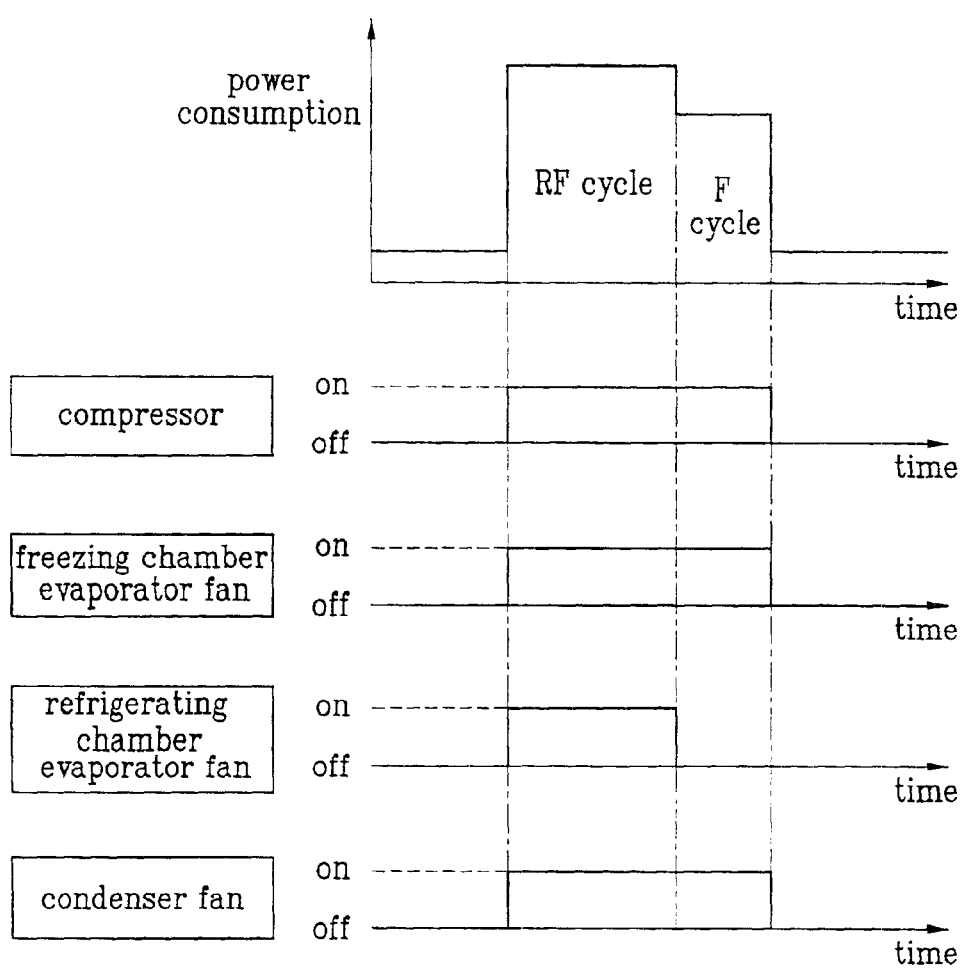

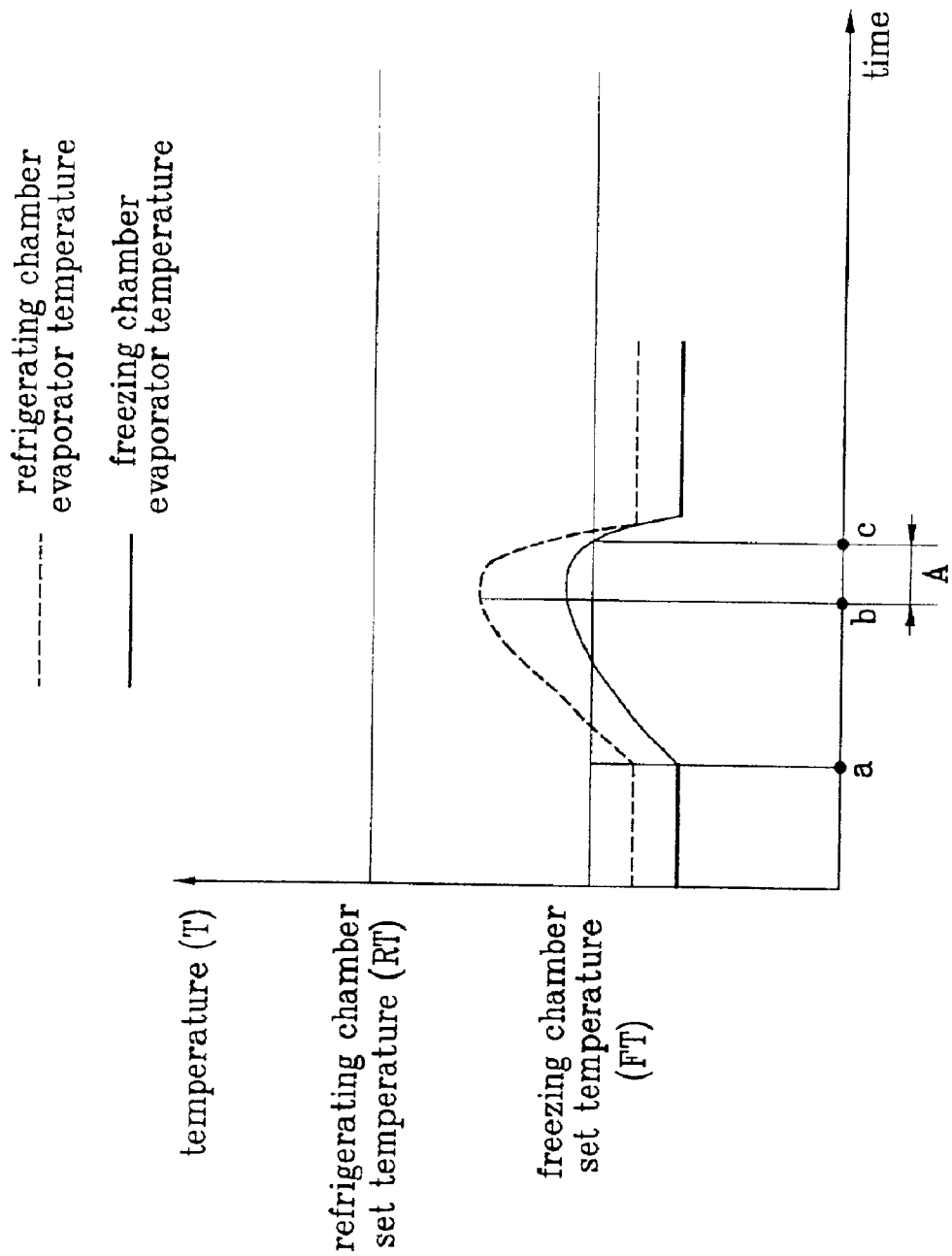

METHOD FOR CONTROLLING POWER SAVING OPERATION OF REFRIGERATOR WITH TWO EVAPORATOR

This application claims the benefit of the Korean Application Nos. P2001-17950, P2001-17951, and P2001-17952, each filed on Apr. 4, 2001, and P2001-24877 filed on May 8, 2001 which are hereby incorporated by reference.

BACKGROUND OF THE INVENTION

1. Field of the Invention

The present invention relates to a refrigerator, and more particularly, to a method for controlling power saving operation of a refrigerator with two evaporators.

2. Background of the Related Art

Nowadays, with regard to the refrigerator for fresh conservation of food for a long time, there has been ceaseless development of the refrigerator for effective conservation of kimchi, a Korean specialty food. Though not shown, the refrigerator is provided with a body, a freezing chamber for frozen conservation of food, a refrigerating chamber for cold conservation of food, and a system of refrigerating cycle for cooling down the freezing chamber and the refrigerating chamber.

Referring to FIG. 1, the refrigerating cycle is provided with a compressor 1 for compressing refrigerant, a condenser 2 for isobaric condensing of the compressed refrigerant, a capillary tube 3 for adiabatic expansion of the condensed refrigerant, and a refrigerating chamber evaporator 4 and a freezing chamber evaporator 5 fitted to the refrigerating chamber and the freezing chamber respectively for isobaric evaporation of the expanded refrigerant.

Further to this, the refrigerating cycle has a three way valve 6 at a branch point for selective flow of the refrigerant condensed at the condenser 2 along branched flow passages to the refrigerating chamber evaporator 4 or the freezing chamber evaporator 5, a condenser fan 2a at the condenser 2 for cooling the condenser or the compressor 1, a refrigerating chamber evaporator fan 4a at the refrigerating chamber evaporator 4 for forced circulation of the air heat exchanged at the refrigerating chamber evaporator to accelerate heat exchange, and a freezing chamber evaporator fan 5a at the freezing chamber evaporator 5 for forced circulation of the air heat exchanged at the freezing chamber evaporator to accelerate heat exchange.

The operation of the foregoing refrigerating cycle will be explained.

First, in a RF cycle operation when both the refrigerating chamber evaporator 4 and the freezing chamber evaporator 5 are in operation, the three way valve 6 is opened to the refrigerating chamber evaporator for flow of the refrigerant, and the gaseous refrigerant compressed at the compressor us involved in a phase change into a liquid refrigerant as the compressed gaseous refrigerant passes through the condenser 2 where the compressed gaseous refrigerant heat exchanges with air outside of the refrigerator, the liquid refrigerant is involved in a pressure drop as the liquid refrigerant passes through the capillary tube 3, the liquid refrigerant is involved in a phase change into gaseous refrigerant as the liquid refrigerant passes through the refrigerating chamber evaporator 4 and the freezing chamber evaporator 5 in succession where the liquid refrigerant heat exchanges with the air in the refrigerating chamber/freezing chamber respectively, and the gaseous refrigerant returns to the compressor, again.

Second, in an 'F' cycle operation when only the freezing chamber evaporator 5 is in operation, the three way valve 6 is opened to the freezing chamber evaporator for flow of the refrigerant, and the gaseous refrigerant compressed at the compressor 1 is involved in a phase change into a liquid refrigerant as the compressed gaseous refrigerant passes through the condenser 2 where the compressed gaseous refrigerant heat exchanges with air outside of the refrigerator, the liquid refrigerant is involved in a pressure drop as the liquid refrigerant passes through the capillary tube 3, the liquid refrigerant is involved in a phase change into gaseous refrigerant as the liquid refrigerant passes through the freezing chamber evaporator 5 where the liquid refrigerant heat exchanges with the air in the freezing chamber, and the gaseous refrigerant returns to the compressor, again.

In the meantime, a related art method for controlling operation of the refrigerator will be explained with reference to FIG. 2.

When the refrigerator comes into operation after stop of the operation, a RF cycle operation is started as the compressor 1 is put into operation, when the freezing chamber evaporator fan 5a, the refrigerating chamber evaporator fan 4a, and the condenser fan 2a are put into operation on the same time.

During the RF cycle operation, if a temperature of the refrigerating chamber is below a set temperature, and a temperature of the freezing chamber is over a set temperature, the RF cycle operation is changed over to the F cycle operation, when the refrigerating chamber evaporator fan 4a is stopped, while the condenser fan 2a and the freezing chamber fan 5a continue the operation.

Thereafter, when the temperature of the freezing chamber is below the set temperature, the F cycle operation is finished, to stop the condenser fan 2a and the refrigerating chamber evaporator fan 5a.

However, when the refrigerator comes into operation again to start the RF cycle, when the RF cycle operation is changed over to the F cycle operation, and when the operation of the refrigerator is finished to end the RF cycle, or the F cycle, the refrigerating chamber evaporator fan 4a, the freezing chamber evaporator fan 5a, and the condenser fan 2a are turned on/off on the same time, to cause the following problems.

First, when the operation of the refrigerator is stopped, as the refrigerant in the refrigerating cycle comes into a temperature equilibrium, the temperatures of the refrigerant in the refrigerating chamber evaporator 4 and the freezing chamber evaporator 5 rise.

Thereafter, when the refrigerator comes into operation again, to start the RF cycle operation, the high temperature refrigerant in the refrigerating chamber evaporator 4 flows to the freezing chamber evaporator 5, to elevate the temperature of the freezing chamber evaporator. In this instance, if the RF cycle operation and the freezing chamber evaporator fan 5a are put into operation on the same time, the air temperature in the freezing chamber is elevated substantially than the set temperature due to accelerated heat exchange, resulting in an increased power consumption.

Second, when operation of the refrigerator is stopped, as the operation of the compressor 1 and the freezing chamber evaporator fan 5a are stopped, and the refrigerant in the refrigerating cycle comes into the temperature equilibrium, the temperature of the refrigerant in the refrigerating chamber evaporator 4 or the refrigerant in the freezing chamber evaporator 5 rises, during which temperature rise, the refrigerant in the freezing chamber evaporator is in a liquid phase if the refrigerant in the freezing chamber evaporator has a temperature close to the freezing chamber set temperature. Consequently, when the refrigerator is put into operation again, the compressor 1 may be broken, or has a poor compression efficiency as the incompressive liquid refrigerant is introduced into the compressor 1.

When the refrigerator is stopped, refrigerant flow into the freezing chamber evaporator 5 is cut off, the operation of the freezing chamber evaporator fan 5a is stopped, and the temperature of the refrigerant remained in the freezing chamber evaporator 5 rises as the temperature equilibrium is established. However, the stop of the freezing chamber evaporator fan 5a results in abandonment of a refrigerating capability, a waste of energy, remained in the freezing chamber evaporator 5 as it is, because, though the refrigerant temperature starts to rise from a time operation of the refrigerator is stopped, the refrigerant temperature rises below a freezing chamber set temperature range up to a certain time period.

Third, when the RF cycle operation is discontinued as the RF cycle operation is changed over to the F cycle operation, or the operation of the refrigerator is stopped, the refrigerant flow into the refrigerating chamber evaporator 4 is cut off, and operation of the refrigerating evaporator fan 4a is stopped, to cause temperature rise of the refrigerant remained in the refrigerating chamber evaporator 4 as the temperature equilibrium is established. However, the stop of the refrigerating chamber evaporator fan 4a results in abandonment of a refrigerating capability, a waste of energy, remained in the evaporating chamber evaporator 4 as it is, because, though the refrigerant temperature starts to rise from a time operation of the refrigerator is stopped, the refrigerant temperature rises below a refrigerating chamber set temperature range up to a certain time period.

Fourth, right after operation of the condenser fan 2a is stopped on the same time with the stopping of the operation of the compressor 1, since pressures of a refrigerant outlet and inlet of the compressor are not balanced until a certain time period is passed when the pressures are balance at a pressure lower than a high pressure at the outlet and higher than a lower pressure at the inlet, the refrigerant flows from the outlet to the inlet of the compressor 1 for the certain time period, causing high pressure and high temperature refrigerant to flow into the low pressure and low temperature evaporators 4 and 5, that elevates temperatures of the evaporators 4 and 5.

That is, if the operation of the compressor 1 is stopped in the F cycle, high pressure and high temperature refrigerant flows into the low pressure and low temperature freezing chamber evaporator 5, to elevate the temperature of the freezing chamber evaporators, and, if the operation of the compressor 1 is stopped in the RF cycle, high pressure and high temperature refrigerant flows into the low pressure and low temperature refrigerating chamber evaporator 4 and the freezing chamber evaporator 5, to elevate the temperatures of the two evaporators. Consequently, the temperature in the freezing chamber or the refrigerating chamber exceeds the set temperature within a short time period, requiring an increase of a number of operation times of the compressor 1, with an increased power consumption.

SUMMARY OF THE INVENTION

Accordingly, the present invention is directed to a method for controlling power saving operation of a refrigerator with two evaporators that substantially obviates one or more of the problems due to limitations and disadvantages of the related art.

An object of the present invention is to provide a method for controlling power saving operation of a refrigerator with two evaporators, which can reduce a power consumption, and improve an efficiency of the refrigerator.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for controlling power saving operation of a refrigerator with two evaporators, which refrigerator carries out a RF cycle for sequential operation of a compressor—a condenser—a refrigerating chamber evaporator—a freezing chamber evaporator and an F cycle for sequential operation of the compressor—the condenser—the freezing chamber evaporator in parallel if necessary, the method includes the step of stopping a freezing chamber evaporator fan at a freezing chamber evaporator for a first set time period for suppressing heat exchange of the freezing chamber evaporator having high temperature refrigerant introduced thereto from the refrigerating chamber evaporator to prevent temperature rise of the freezing chamber.

In another aspect of the present invention, there is provided a method for controlling power saving operation of a refrigerator with two evaporators, which refrigerator carries out a RF cycle for sequential operation of a compressor—a condenser—a refrigerating chamber evaporator—a freezing chamber evaporator and an F cycle for sequential operation of the compressor—the condenser—the freezing chamber evaporator in parallel if necessary, the method including the step of extending operation of a freezing chamber evaporator fan at the freezing chamber evaporator for a second set time period for changing a phase of the refrigerant remained in the freezing chamber evaporator from liquid to gas and utilizing a cooling capability remained in the freezing chamber evaporator in maintaining a freezing chamber temperature at the freezing chamber set temperature when the compressor is stopped.

In further aspect of the present invention, there is provided a method for controlling power saving operation of a refrigerator with two evaporators, which refrigerator carries out a RF cycle for sequential operation of a compressor—a condenser—a refrigerating chamber evaporator—a freezing chamber evaporator and an F cycle for sequential operation of the compressor—the condenser—the freezing chamber evaporator in parallel if necessary, the method comprising the step of extending operation of a refrigerating chamber evaporator fan at the refrigerating chamber evaporator for a third set time period, for utilizing a cooling capability remained in the refrigerating chamber evaporator in maintaining a refrigerating chamber temperature at the refrigerating chamber set temperature when the RF cycle operation is stopped.

In further aspect of the present invention, there is provided a method for controlling power saving operation of a refrigerator with two evaporators, which refrigerator carries out a RF cycle for sequential operation of a compressor—a condenser—a refrigerating chamber evaporator—a freezing chamber evaporator and an F cycle for sequential operation of the compressor—the condenser—the freezing chamber evaporator in parallel if necessary, the method comprising the step of extending operation of the condenser fan at the condenser when the compressor is stopped for a fourth set time period, for dropping a temperature of the refrigerant discharged from the outlet of the compressor in a high temperature and high pressure state during the pressure equilibrium is established between the outlet and inlet of the compressor and introducing the refrigerant into the freezing chamber evaporator or the refrigerating chamber evaporator in a low temperature state.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2 illustrates a timing diagram of a related art method for controlling operation of a refrigerator with two evaporators, wherein on/off timings of a compressor, a freezing chamber evaporation fan, a refrigerating chamber evaporation fan, and a condenser fan in RF or F cycle operation are shown;

FIG. 3B illustrates a graph showing a first setting time period 'A' when a freezing chamber evaporator fan is stopped in the method for controlling power saving operation of a refrigerator with two evaporators according to a first preferred embodiment of the present invention;

DETAILED DESCRIPTION OF THE PREFERRED EMBODIMENT

Reference will now be made in detail to the preferred embodiments of the present invention, examples of which are illustrated in the accompanying drawings. In explanation of the present invention, explanation of a system of a refrigerator with two evaporators will be omitted since the system is explained in explanation of the related art, and parts in the present invention identical to the related art will be given identical reference symbols.

Figure 1:
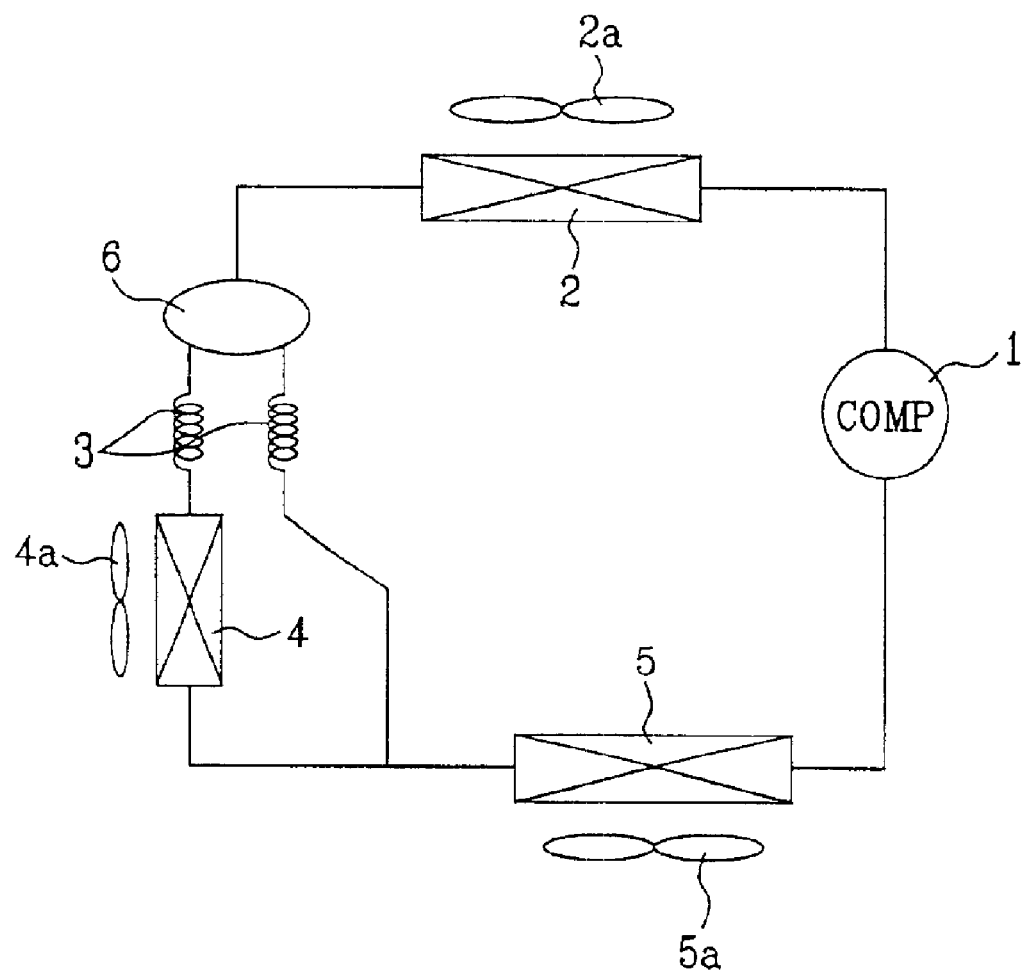
FIG. 1 illustrates a block diagram showing a related art refrigerating cycle.
Figure 3A:
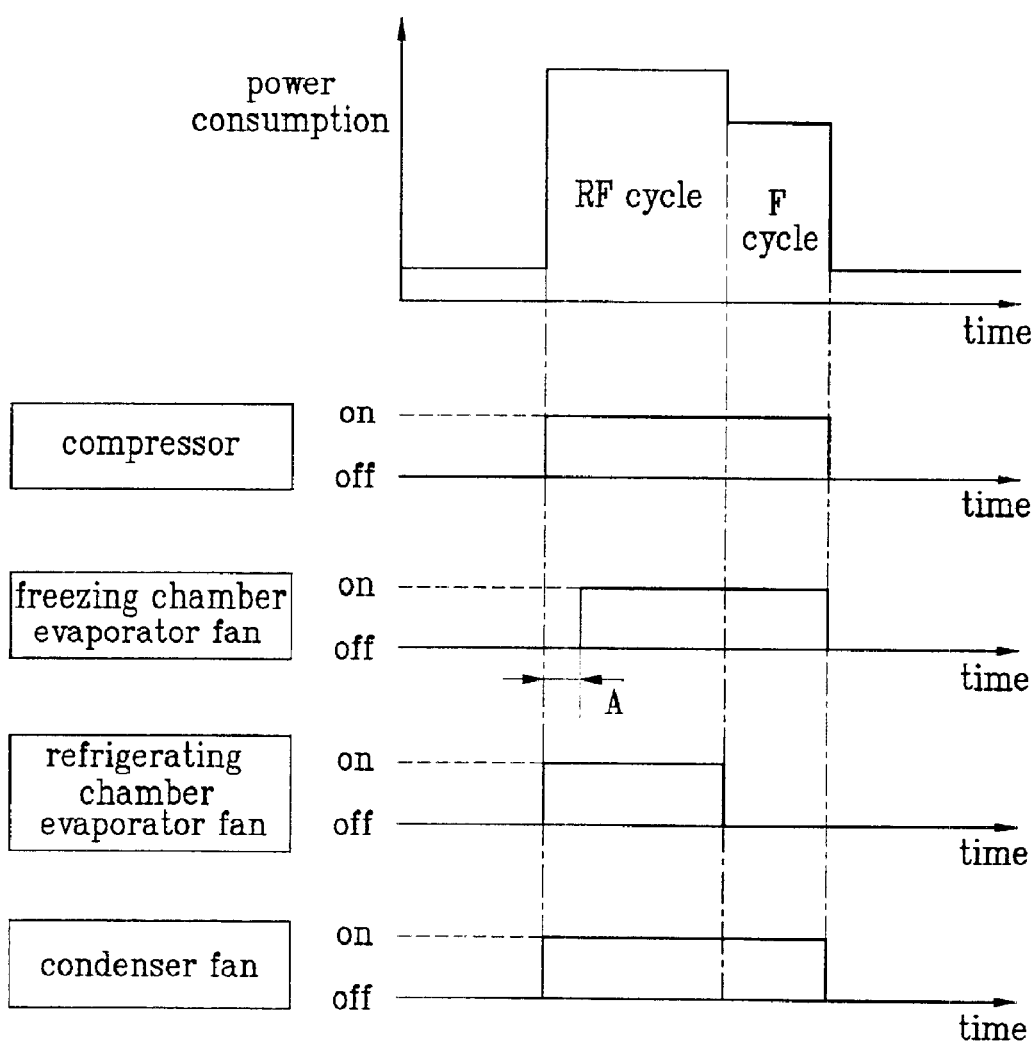
FIG. 3A illustrates a timing diagram of a method for controlling power saving operation of a refrigerator with two evaporators in accordance with a first preferred embodiment of the present invention, wherein on/off timings of a refrigerating chamber evaporation fan in RF or F cycle operation are shown.

Referring to FIGS. 3A and 3B, the method for controlling power saving operation of a refrigerator with two evaporators in accordance with a first preferred embodiment of the present invention, which refrigerator carries out a RF cycle for sequential operation of a compressor 1—a condenser 2—a refrigerating chamber evaporator 4—a freezing chamber evaporator 5 and an F cycle for sequential operation of the compressor—the condenser—the freezing chamber evaporator in parallel if necessary, includes the step of stopping operation of the freezing chamber evaporator fan 5a at the freezing chamber evaporator 5 for a first set time period 'A', for suppression of heat exchange of the freezing chamber evaporator 5 having hot refrigerant introduced from the refrigerating chamber evaporator 4, to cut off a temperature rise of the freezing chamber in an initial stage of the RF cycle operation.

Referring to FIG. 3B, it is preferable that the first set time period 'A' is from starting of the RF cycle operation 'b' to a time point 'c' a temperature of the refrigerant in the freezing chamber evaporator 5 is lower than a freezing chamber set temperature FT or a higher time point close thereto. A time period until the time point 'c' is a value that can be calculated, and the higher time point close thereto is a possible error value.

The method for controlling power saving operation of a refrigerator with two evaporators in accordance with a first preferred embodiment of the present invention will be explained in more detail with reference to FIGS. 3A and 3B.

Referring to FIG. 3B, even if the refrigerator is put into operation at a time point 'b' again after the refrigerator is stopped, the freezing chamber evaporator fan 5a is not put into operation continuously for prevention of heat exchange between the freezing chamber evaporator and the freezing chamber, because the temperature of refrigerant in the freezing chamber evaporator 5 is higher than the freezing chamber set temperature FT. The freezing chamber evaporator fan 5a is not put into operation until the temperature of the freezing chamber drops lower the freezing chamber set temperature FT at the time point 'c', thereby preventing the freezing chamber from being heated to a high temperature, and reducing power consumption of the refrigerator.

Figure 4A:
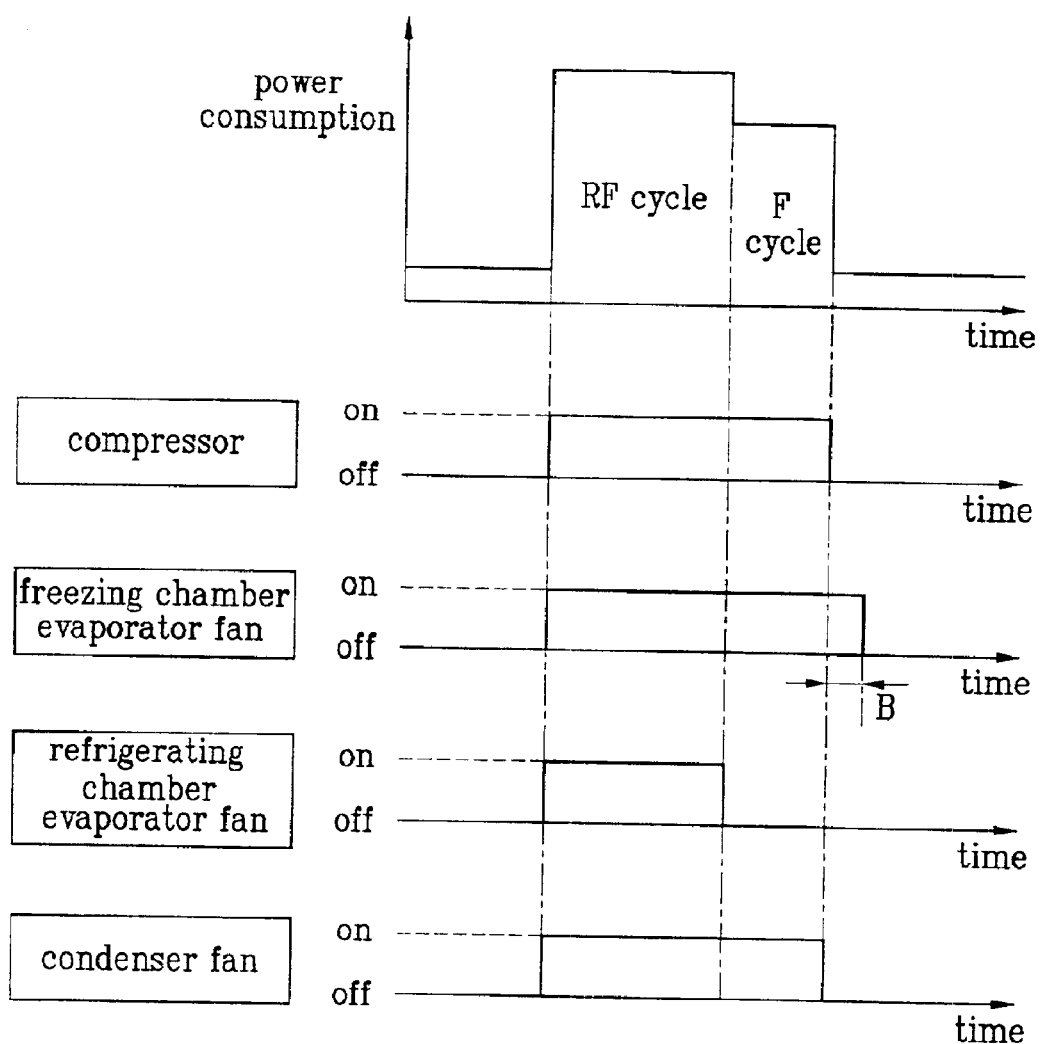
FIG. 4A illustrates a timing diagram of a method for controlling power saving operation of a refrigerator with two evaporators in accordance with a second preferred embodiment of the present invention, wherein on/off timings of a refrigerating chamber evaporation fan in RF or F cycle operation are shown.
Figure 4B:
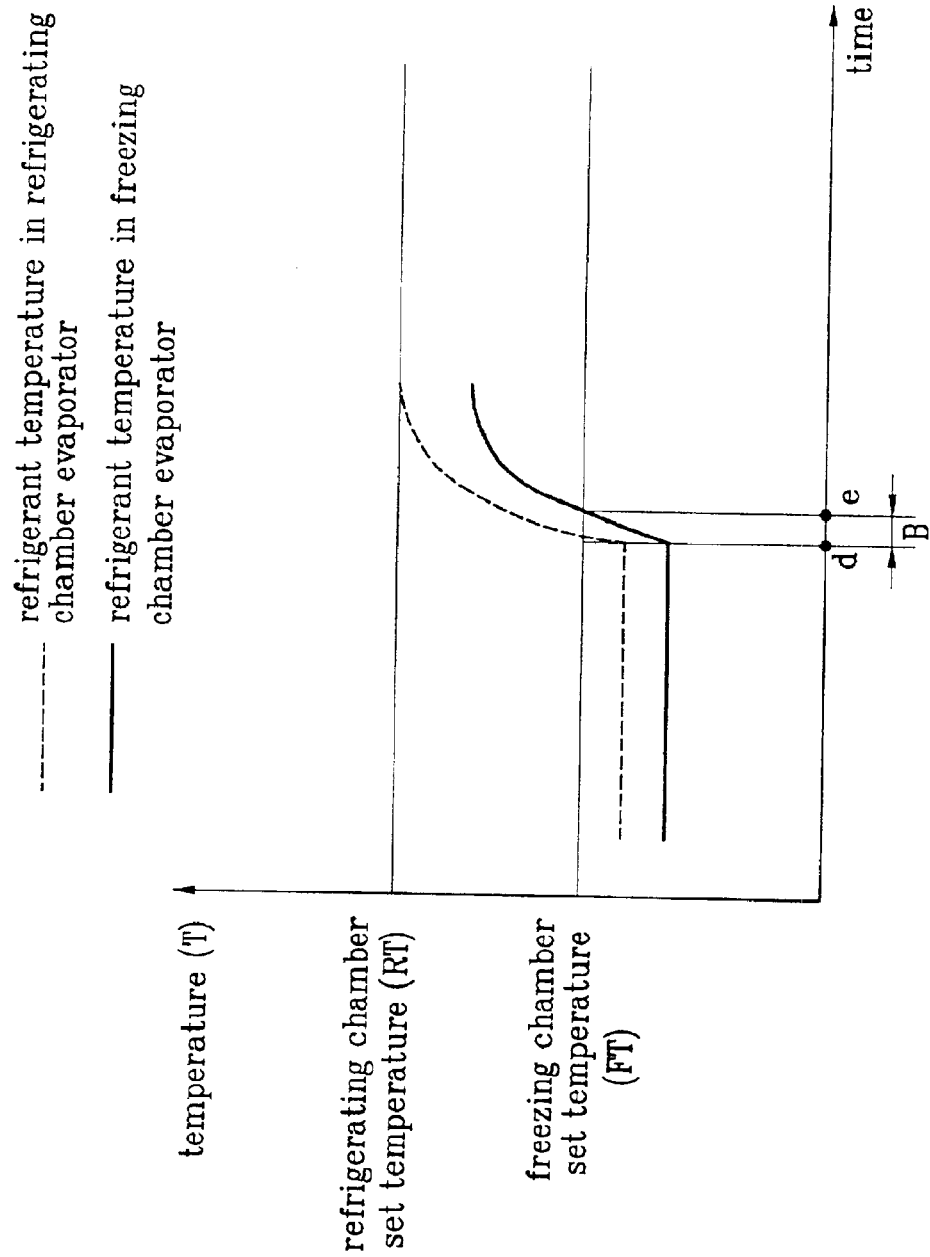
FIG. 4B illustrates a graph showing a second setting time period 'B' when operation of a freezing chamber evaporator fan is extended in the method for controlling power saving operation of a refrigerator with two evaporators according to a second preferred embodiment of the present invention.

Referring to FIGS. 4A and 4B, the method for controlling power saving operation of a refrigerator with two evaporators in accordance with a second preferred embodiment of the present invention, which refrigerator carries out a RF cycle for sequential operation of a compressor 1—a condenser 2—a refrigerating chamber evaporator 4—a freezing chamber evaporator 5 and an F cycle for sequential operation of the compressor—the condenser—the freezing chamber evaporator in parallel if necessary, includes the step of extending operation of the freezing chamber evaporator fan 5a at the freezing chamber evaporator 5 for a second set time period 'B', for maintaining a freezing chamber temperature at a set temperature by utilizing both a phase conversion of the liquid refrigerant remained in the freezing chamber evaporator 5 into a gaseous refrigerant and a cooling capability remained in the freezing chamber evaporator when the compressor 1 is stopped.

Referring to FIG. 4B, it is preferable that the second set time period 'B' is from a time point 'd' when operation of the compressor 1 is stopped to a time point 'e' when a temperature of the refrigerant in the freezing chamber evaporator 5 becomes higher than a freezing chamber set temperature FT or a lower time point close thereto. A time period until the time point 'e' is a value that can be calculated, and the lower time point close thereto is a possible error value.

The method for controlling power saving operation of a refrigerator with two evaporators in accordance with a second preferred embodiment of the present invention will be explained in more detail with reference to FIGS. 4A and 4B.

When the refrigerator is stopped, a temperature of the refrigerant in the refrigerating chamber evaporator 4 or the freezing chamber evaporator 5 rises as the refrigerant in the refrigerating cycle establishes a temperature equilibrium.

During such a temperature rise, when the temperature of the refrigerant in the freezing chamber evaporator 5 is in a range below the freezing chamber set temperature FT, or a higher range close thereto, the refrigerant in the freezing chamber evaporator 5 is in a liquid phase, to cause breakage of the compressor or drop of a compression efficiency as the incompressive liquid refrigerant is introduced into the compressor 1 when the refrigerator is put into operation again.

In this regard, in the method for controlling power saving operation of a refrigerator with two evaporators in accordance with a second preferred embodiment of the present invention, operation of the freezing chamber evaporator fan 5a is extended from a time point 'd' the compressor 1 is stopped to a time point 'e' the temperature of the refrigerant in the freezing chamber evaporator 5 becomes higher than the freezing chamber set temperature FT, for maintaining the freezing chamber set temperature FT and converting a liquid phase of the refrigerant in the freezing chamber evaporator 5 into a gaseous phase by using a cooling capability obtained by the extension.

Accordingly, as the freezing chamber set temperature FT is maintained by using the cooling capability of the freezing chamber evaporator 5, power consumption of the refrigerator can be reduced. Moreover, the introduction of gaseous refrigerant into the compressor 1 permits to secure a reliability of the compressor and improve the compression efficiency.

Figure 5A:
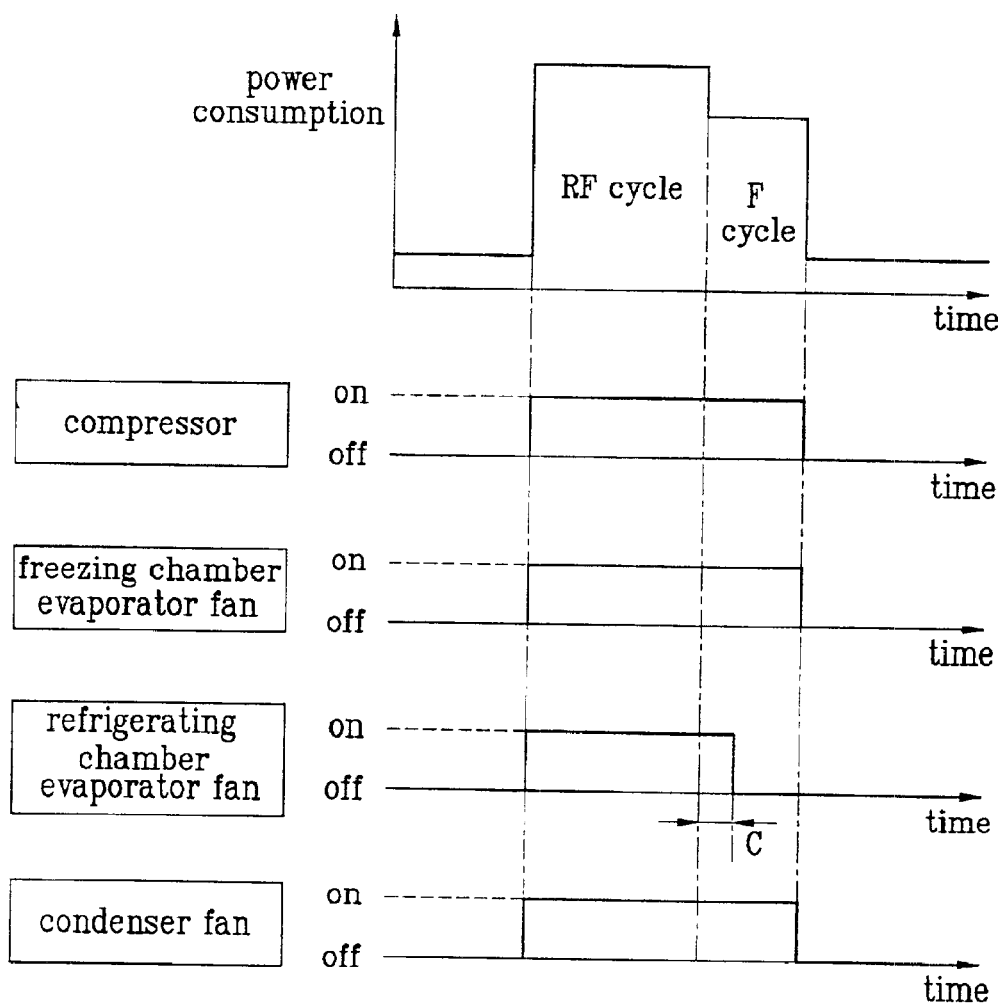
FIG. 5A illustrates a timing diagram of a method for controlling power saving operation of a refrigerator with two evaporators in accordance with a third preferred embodiment of the present invention, wherein on/off timings of a refrigerating chamber evaporation fan in RF or F cycle operation are shown.
Figure 5B:
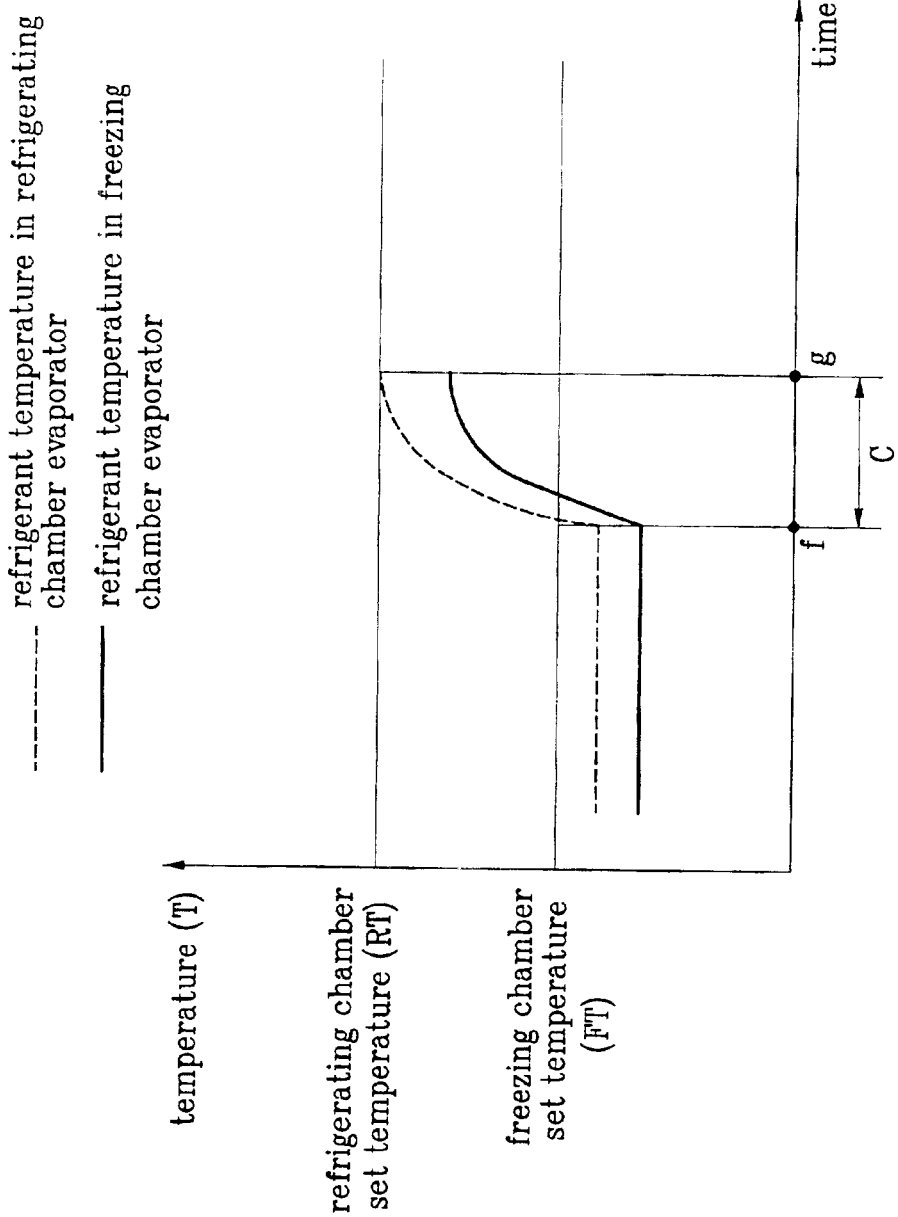
FIG. 5B illustrates a graph showing a third setting time period 'C' when operation of a refrigerating chamber evaporator fan is extended in the method for controlling power saving operation of a refrigerator with two evaporators according to a third preferred embodiment of the present invention.

Referring to FIGS. 5A and 5B, the method for controlling power saving operation of a refrigerator with two evaporators in accordance with a third preferred embodiment of the present invention, which refrigerator carries out a RF cycle for sequential operation of a compressor 1—a condenser 2—a refrigerating chamber evaporator 4—a freezing chamber evaporator 5 and an F cycle for sequential operation of the compressor—the condenser—the freezing chamber evaporator in parallel if necessary, includes the step of extending operation of the refrigerating chamber evaporator fan 4a at the refrigerating chamber evaporator 4 for a third set time period 'C', for maintaining a refrigerating chamber temperature at a set temperature by utilizing a cooling capability remained in the refrigerating chamber evaporator 4 when the RF cycle operation is stopped.

Referring to FIG. 5B, it is preferable that the third set time period 'C' is from a time point 'f' when the RF cycle operation is stopped to a time point 'g' when a temperature of the refrigerant in the refrigerating chamber evaporator 4 becomes higher than a refrigerating chamber set temperature FT or a lower time point close thereto. A time period until the time point 'g' is a value that can be calculated, and the lower time point close thereto is a possible error value.

The method for controlling power saving operation of a refrigerator with two evaporators in accordance with a third preferred embodiment of the present invention will be explained in more detail with reference to FIGS. 5A and 5B.

When the RF cycle operation is stopped at the time point 'f', a temperature of the refrigerant in the refrigerating chamber evaporator 4 or the freezing chamber evaporator 5 rises as the refrigerant in the refrigerating cycle establishes a temperature equilibrium.

During such a temperature rise, since the temperature rise is within a range below the refrigerating chamber set temperature RT for a certain time period 'C' even though the temperature of the refrigerant in the refrigerating chamber evaporator 4 starts to rise from a time point 'f' the RF cycle operation is stopped, operation of the refrigerating chamber evaporator fan 4a is extended to the time period 'C', for maintaining the refrigerating chamber set temperature RT by using a cooling capability of the refrigerating chamber evaporator generated from the extended operation.

Also, during such a temperature rise, when the temperature of the refrigerant in the refrigerating chamber evaporator 4 is in a range 'C' below the refrigerating chamber set temperature RT, or a higher range close thereto, the refrigerant in the refrigerating chamber evaporator 4 is in a liquid phase, to cause breakage of the compressor or drop of a compression efficiency as the incompressive liquid refrigerant is introduced into the compressor 1 when the refrigerator is put into operation again.

In this regard, in the method for controlling power saving operation of a refrigerator with two evaporators in accordance with a third preferred embodiment of the present invention, operation of the refrigerating chamber evaporator fan 4a is extended from a time point 'f' the RF cycle operation is stopped to a time point 'g' the temperature of the refrigerant in the refrigerating chamber evaporator 4 becomes higher than the refrigerating chamber set temperature RT, for converting a liquid phase of the refrigerant in the refrigerating chamber evaporator 4 into a gaseous phase.

Accordingly, as the refrigerating chamber set temperature RT is maintained by using the cooling capability of the refrigerating chamber evaporator 4, power consumption of the refrigerator can be reduced. Moreover, the introduction of gaseous refrigerant into the compressor 1 permits to secure a reliability of the compressor and improve the compression efficiency.

Figure 6A:
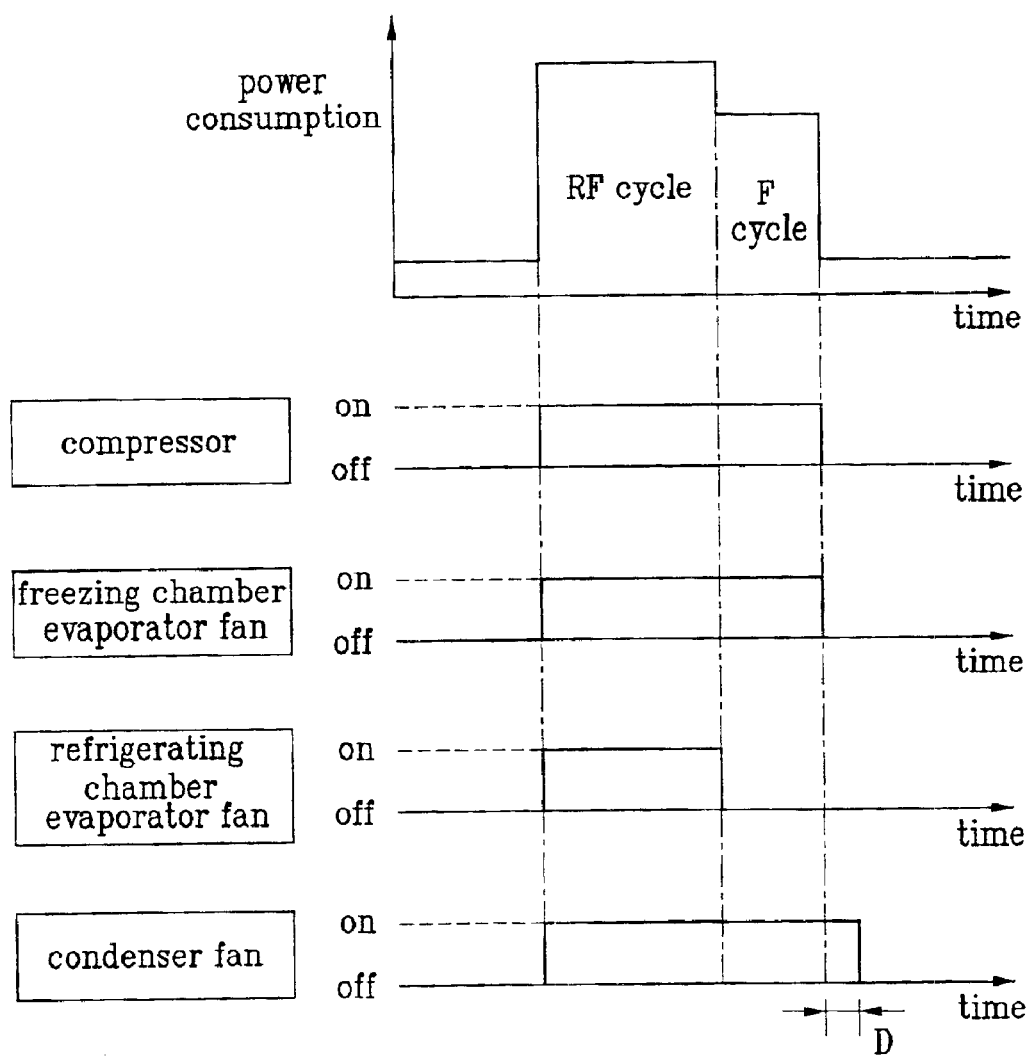
FIG. 6A illustrates a timing diagram of a method for controlling power saving operation of a refrigerator with two evaporators in accordance with a fourth preferred embodiment of the present invention, wherein on/off timings of a condenser fan in RF or F cycle operation are shown.
Figure 6B:
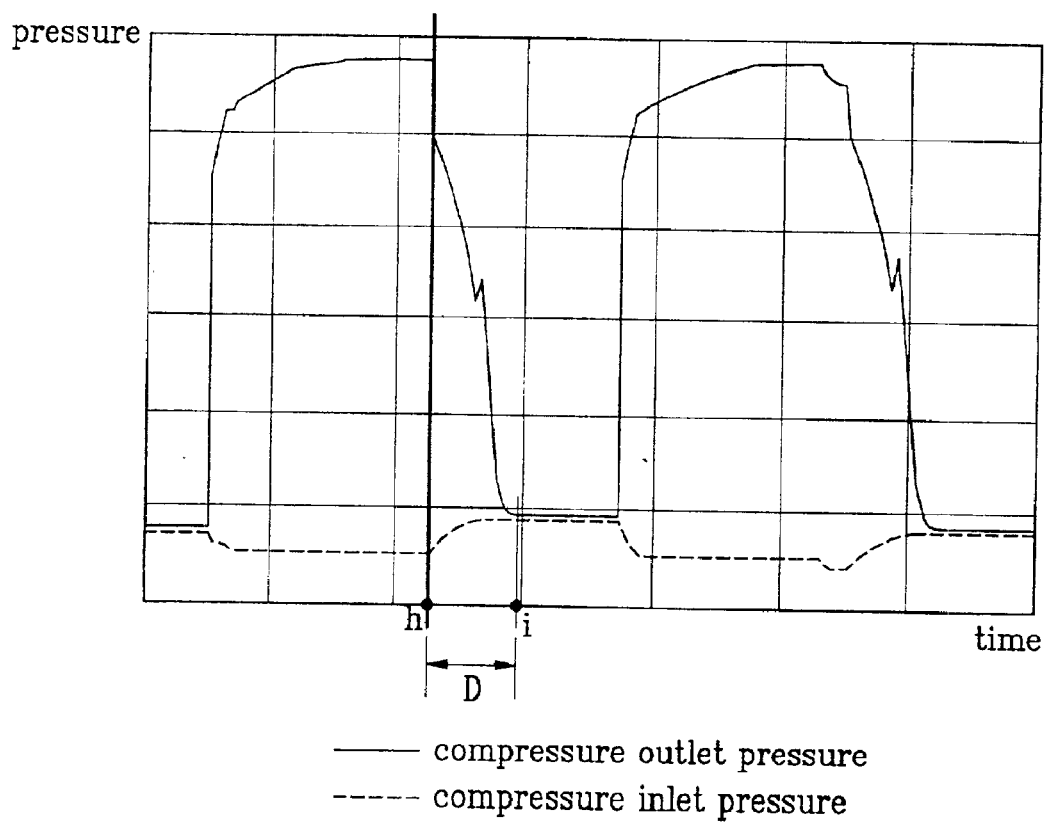
FIG. 6B illustrates a graph showing a fourth setting time period 'D' when operation of a freezing chamber evaporator fan is extended in the method for controlling power saving operation of a refrigerator with two evaporators according to a fourth preferred embodiment of the present invention; and, FIG. 7 illustrates a timing diagram showing on/off states of respective fans in the first to fourth embodiments of the present invention.

Referring to FIGS. 6A and 6B, the method for controlling power saving operation of a refrigerator with two evaporators in accordance with a fourth preferred embodiment of the present invention, which refrigerator carries out a RF cycle for sequential operation of a compressor 1—a condenser 2—a refrigerating chamber evaporator 4—a freezing chamber evaporator 5 and an F cycle for sequential operation of the compressor—the condenser—the freezing chamber evaporator in parallel if necessary, includes the step of extending operation of the condenser fan 2a at the condenser 2 for a fourth set time period 'D', for dropping a temperature of the refrigerant discharged in a high temperature and high pressure state from an outlet of the compressor during a pressure equilibrium is established between the outlet and inlet of the compressor when the compressor 1 is stopped, and introducing the refrigerant in a low temperature state into the freezing chamber evaporator 5 or the refrigerating chamber evaporator 4.

Referring to FIG. 6B, it is preferable that the fourth set time period 'D' is from a time point 'h' when the compressor 1 is stopped to a time point 'i' when the pressure equilibrium between the outlet and inlet of the compressor 1 is established or a lower time point close thereto. A time period until the time point 'e' is a value that can be calculated, and the lower time point close thereto is a possible error value.

The method for controlling power saving operation of a refrigerator with two evaporators in accordance with a fourth preferred embodiment of the present invention will be explained in more detail with reference to FIGS. 6A and 6B.

When the compressor 1 is stopped, the pressure equilibrium is established as a pressure difference between the outlet and the inlet of the compressor are reduced, during which the high temperature and high pressure refrigerant from the outlet of the compressor is introduced into the freezing chamber evaporator 5 or the refrigerating chamber evaporator 4 through the condenser 2, not directly, but after being involved in a temperature drop by the condenser fan 2a. Since the establishment 'i' of the pressure equilibrium between the outlet and the inlet of the compressor 1 leads to the establishment of the temperature equilibrium between the outlet temperature and the inlet temperature of the compressor, operation of the condenser fan 2a that drops the outlet temperature of the compressor is stopped.

Accordingly, as the low temperature refrigerant is introduced into the evaporators 4 and 5, a freezing or refrigerating efficiency can be improved, and a power consumption of the refrigerator can be reduced.

It is apparent that a combination of the foregoing embodiments has a greater power consumption effect as each of the foregoing embodiments has a power consumption effect. The following embodiments are combinations of the foregoing embodiments.

First, a method for controlling power saving operation of a refrigerator with two evaporators in accordance with a fifth preferred embodiment of the present invention, a combination of the first, and second embodiments, includes the steps of stopping a freezing chamber evaporator fan 5a at a freezing chamber evaporator 5 from an initial RF cycle operation to a time point when a temperature of the refrigerant in the freezing chamber evaporator is below a freezing chamber set temperature, or a higher point close thereto, and extending operation of the freezing chamber evaporator fan 5a at a freezing chamber evaporator 5 from a time point the compressor 1 is stopped to a time point when a temperature of the refrigerant in the freezing chamber evaporator is higher than a freezing chamber set temperature, or a lower point close thereto.

Therefore, the method for controlling power saving operation of a refrigerator with two evaporators in accordance with a fifth preferred embodiment of the present invention has all the effects obtainable both from the first embodiment and the second embodiment. That is, the suppression of heat exchange of the freezing chamber evaporator 5 having high temperature refrigerant introduced thereto from the refrigerating chamber evaporator 4 can prevent the freezing chamber temperature rise, and the phase change of the refrigerant remained in the freezing chamber evaporator 5 improves a refrigerator reliability, and maintains the temperature of the freezing chamber at the set temperature by using a cooling capability remained in the freezing chamber evaporator.

Second, a method for controlling power saving operation of a refrigerator with two evaporators in accordance with a sixth preferred embodiment of the present invention, a combination of the first, and third embodiments, can prevent the freezing chamber temperature rise by the suppression of heat exchange of the freezing chamber evaporator 5 having high temperature refrigerant introduced thereto from the refrigerating chamber evaporator 4, and can improve a refrigerator reliability, and maintain the temperature of the freezing chamber at the set temperature by using a cooling capability remained in the freezing chamber evaporator by the phase change of the refrigerant remained in the freezing chamber evaporator 5.

Third, a method for controlling power saving operation of a refrigerator with two evaporators in accordance with a seventh preferred embodiment of the present invention, a combination of the first, and fourth embodiments, can prevent the freezing chamber temperature rise by the suppression of heat exchange of the freezing chamber evaporator 5 having high temperature refrigerant introduced thereto from the refrigerating chamber evaporator 4, and can make a low temperature refrigerant introduced into the freezing chamber evaporator or the refrigerating chamber evaporator 4 by dropping the temperature of the refrigerant discharged from the outlet of the compressor in a high temperature and high pressure state during the outlet and inlet of the compressor 1 establish a pressure equilibrium.

A combination of the second embodiment and the third embodiment can provide one embodiment, a combination of the second embodiment and the fourth embodiment can provide another embodiment, and a combination of the third embodiment and the fourth embodiment can provide another embodiment. Moreover, combinations of two, three, or entire embodiments selected from the first, second, third, and fourth embodiments also can save power consumption.

A method for controlling power saving operation of a refrigerator with two evaporators will be explained, with reference to FIG. 7.

Figure 7:
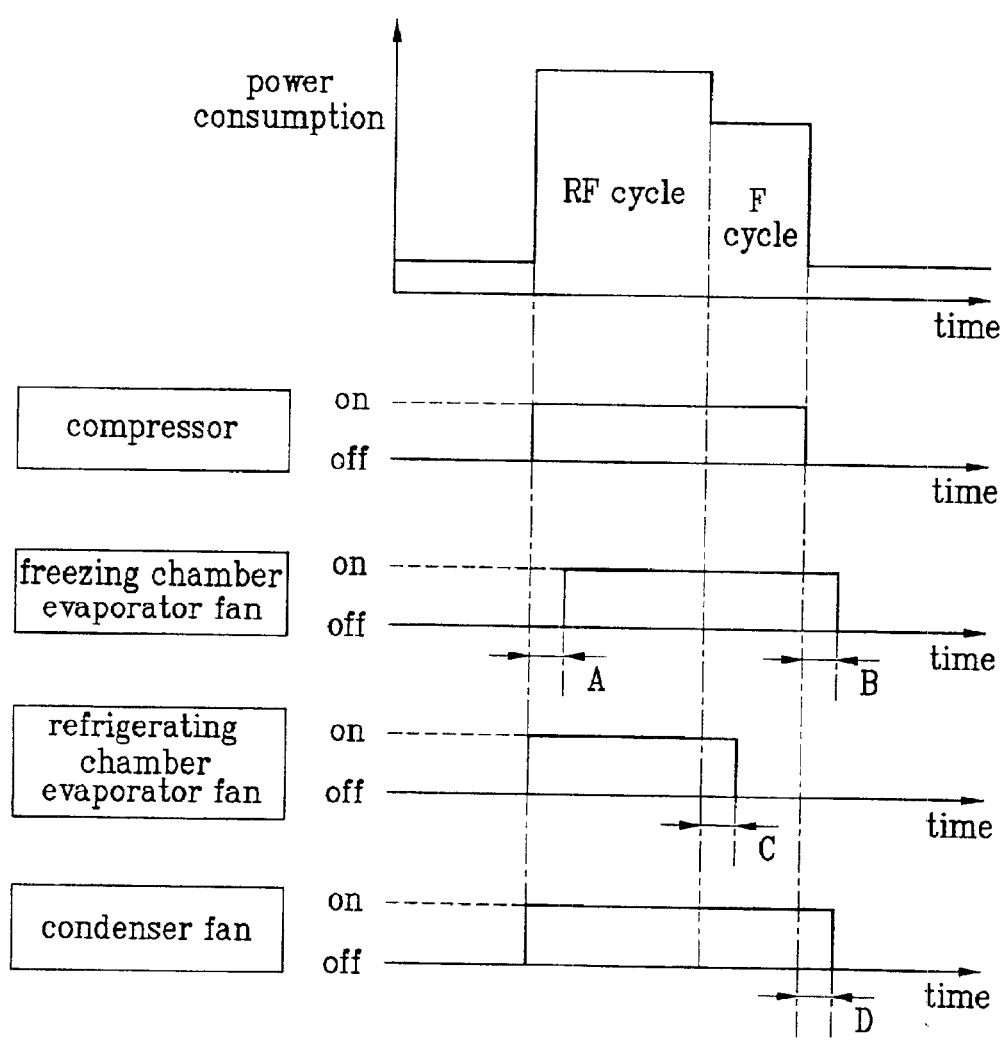

Referring to FIG. 7, the method for controlling power saving operation of a refrigerator with two evaporators having the first to fourth embodiments combined therein, which refrigerator carries out a RF cycle for sequential operation of a compressor 1—a condenser 2—a refrigerating chamber evaporator 4—a freezing chamber evaporator 5 and an F cycle for sequential operation of the compressor—the condenser—the freezing chamber evaporator in parallel if necessary, includes the steps of stopping a freezing chamber evaporator fan 5a at a freezing chamber evaporator 5 from an initial RF cycle operation ('b' in FIG. 3B) to a time point ('c' in FIG. 3B) when a temperature of the refrigerant in the freezing chamber evaporator is below a freezing chamber set temperature (FT in FIG. 3B), or a higher point close thereto, extending operation of the freezing chamber evaporator fan 5a at a freezing chamber evaporator 5 from a time point the compressor 1 is stopped ('d' in FIG. 3B) to a time point ('e' in FIG. 4B) when a temperature of the refrigerant in the freezing chamber evaporator is higher than a freezing chamber set temperature (FT in FIG. 4B), or a lower point close thereto, extending operation of the refrigerating chamber evaporator fan 4a at the refrigerating chamber evaporator 4 when the RF cycle is stopped from a time point ('f' in FIG. 5B) when the RF cycle operation is stopped to a time point ('g' in FIG. 5B) when the temperature of the refrigerant in the refrigerating chamber evaporator is higher than the refrigerating chamber set temperature (RT in FIG. 5B), or a lower point close thereto, and extending operation of the condenser fan 2a at the condenser 2 when the compressor 1 is stopped from a time point ('h' in FIG. 6B) the compressor is stopped to a time point when a pressure equilibrium is established between an outlet and an inlet of the compressor, or a lower point close thereto.

Accordingly, all the effects obtainable from the first to fourth embodiments can be obtained. That is, the suppression of heat exchange of the freezing chamber evaporator 5 having high temperature refrigerant introduced thereto from the refrigerating chamber evaporator 4 can prevent the freezing chamber temperature rise, and the phase change of the refrigerant remained in the freezing chamber evaporator 5 improves a refrigerator reliability, and maintains the temperature of the freezing chamber at the set temperature by using a cooling capability remained in the freezing chamber evaporator.

Also, the phase change of the refrigerant remained in the refrigerating chamber evaporator 4 improves a refrigerator reliability, and maintains the temperature of the refrigerating chamber at the set temperature by using a cooling capability remained in the refrigerating chamber evaporator, and the dropping of the temperature of the refrigerant discharged from the outlet of the compressor in a high temperature and high pressure state during the outlet and inlet of the compressor 1 establish a pressure equilibrium makes a low temperature refrigerant introduced into the freezing chamber evaporator or the refrigerating chamber evaporator 4.

As has been explained, the method for controlling power saving operation of a refrigerator with two evaporators, designed to extend or delay operation of at least any one of the freezing chamber evaporator fan, the refrigerating chamber evaporator fan, and the condenser fan as necessary for reduction of power consumption of the refrigerator, has the following advantages.

First, the method for controlling power saving operation of a refrigerator with two evaporators in accordance with the first embodiment of the present invention prevents the temperature rise of the freezing chamber at an initial stage of the RF cycle, that reduces power consumption significantly.

Second, the method for controlling power saving operation of a refrigerator with two evaporators in accordance with the second embodiment of the present invention can secure a compressor reliability and improve a compression efficiency because the phase change from liquid to gas of the refrigerant remained in the freezing chamber evaporator prevents introduction of incompressible liquid refrigerant into the compressor. Also, the utilization of a cooling capability generated in this phase change permits to maintain the freezing chamber set temperature, that reduces a power consumption.

Third, the method for controlling power saving operation of a refrigerator with two evaporators in accordance with the third embodiment of the present invention can reduce a power consumption because the cooling capability remained in the refrigerating chamber evaporator can be utilized for maintaining the refrigerating chamber set temperature. Also, the phase change from liquid to gas of the refrigerant remained in the refrigerating chamber evaporator prevents introduction of incompressible liquid refrigerant into the compressor when the RF cycle is started again, thereby securing a compressor reliability and improving a compression efficiency.

Fourth, the method for controlling power saving operation of a refrigerator with two evaporators in accordance with the fourth embodiment of the present invention can maintain the freezing chamber evaporator or the refrigerating chamber evaporator at a comparatively low temperature during the compressor is stopped, thereby permitting effective storage of food in a frozen, or refrigerated state. The temperature of the freezing chamber or the refrigerating chamber does not exceed the set temperature within a short time period, thereby permitting a number of compressor starting times, to reduce a power consumption.

It will be apparent to those skilled in the art that various modifications and variations can be made in the method for controlling power saving operation of a refrigerator with two evaporators of the present invention without departing from the spirit or scope of the invention. Thus, it is intended that the present invention cover the modifications and variations of this invention provided they come within the scope of the appended claims and their equivalents.

What is claimed is:

1. A method for controlling a power saving operation of a refrigerator with two evaporators, in which the refrigerator carries out a RF cycle for sequential operation of a compressor, a condenser, a refrigerating chamber evaporator, and a freezing chamber evaporator, and a F cycle for sequential operation of the compressor, the condenser, and the freezing chamber evaporator the method comprising:

stopping operation of a freezing chamber evaporator fan for a set time so as to suppress a heat exchange effect of the freezing chamber evaporator and to prevent a temperature rise of the freezing chamber.

2. The method as claimed in claim 1, wherein the set time period is from a point of initial RF cycle operation to a point when a temperature of a refrigerant in the freezing chamber evaporator is lower than a predetermined freezing chamber temperature, or a higher time point close thereto.

3. The method as claimed in claim 1, further comprising extending operation of the freezing chamber evaporator fan from a point when the compressor is stopped to a point when a temperature of a refrigerant in the freezing chamber evaporator is higher than a predetermined freezing chamber temperature, or a lower point close thereto, so as to allow the refrigerant remaining in the freezing chamber evaporator to change from a liquid state to a gaseous state, and to utilize a cooling capability remaining in the freezing chamber evaporator so as to maintain the freezing chamber within a predetermined temperature range when the compressor is stopped.

4. The method as claimed in claim 1, further comprising extending operation of a refrigerating chamber evaporator fan from a point when the RF cycle operation is stopped to a point when a temperature of a refrigerant in the refrigerating chamber evaporator is higher than a predetermined refrigerating chamber temperature, or a lower point close thereto, so as to utilize a cooling capability remaining in the refrigerating chamber evaporator and maintain a refrigerating chamber temperature within a predetermined temperature range when the RF cycle operation is stopped.

5. The method as claimed in claim 1, further comprising extending operation of a condenser fan from a point when the compressor is stopped to a point when a pressure equilibrium is established between an outlet and an inlet of the compressor, or a lower point close thereto, so as to drop a temperature of a refrigerant discharged from the outlet of the compressor when the pressure equilibrium is established between the outlet and inlet of the compressor, and to introduce the refrigerant into the freezing chamber evaporator or the refrigerating chamber evaporator in a low temperature state.

6. A method for controlling a power saving operation of a refrigerator with two evaporators, in which the refrigerator carries out a RF cycle for sequential operation of a compressor, a condenser, a refrigerating chamber evaporator, and a freezing chamber evaporator, and a F cycle for sequential operation of the compressor, the condenser, and the freezing chamber evaporator, the method comprising:

extending operation of a freezing chamber evaporator fan for a set time period so as to change a phase of a refrigerant remaining in the freezing chamber evaporator from liquid to gas, and to utilize a cooling capability remaining in the freezing chamber evaporator so as to maintain a freezing chamber temperature within a predetermined temperature range when the compressor is stopped, wherein the set time period extends from a point when the compressor is stopped to a point when a temperature of the refrigerant in the freezing chamber evaporator is higher than a predetermined freezing chamber temperature, or a lower time point close thereto.

7. A method for controlling a power saving operation of a refrigerator with two evaporators, in which the refrigerator carries out a RF cycle for sequential operation of a compressor, a condenser, a refrigerating chamber evaporator, and a freezing chamber evaporator, and a F cycle for sequential operation of the compressor, the condenser, and the freezing chamber evaporator, the method comprising:

extending operation of a freezing chamber evaporator fan for a set time period so as to change a phase of a refrigerant remaining in the freezing chamber evaporator from liquid to gas, and to utilize a cooling capability remaining in the freezing chamber evaporator so as to maintain a freezing chamber temperature within a predetermined temperature range when the compressor is stopped; and extending operation of a refrigerating chamber evaporator fan from a point when the RF cycle operation is stopped to a point when a temperature of the refrigerant in the refrigerating chamber evaporator is higher than a predetermined refrigerating chamber temperature, or a lower point close thereto, so as to utilize a cooling capability remaining in the refrigerating chamber evaporator and maintain a refrigerating chamber temperature within a predetermined temperature range when the RF cycle operation is stopped.

8. A method for controlling a power saving operation of a refrigerator with two evaporators, in which the refrigerator carries out a RF cycle for sequential operation of a compressor, a condenser, a refrigerating chamber evaporator, and a freezing chamber evaporator, and a F cycle for sequential operation of the compressor, the condenser, and the freezing chamber evaporator, the method comprising:

extending operation of a freezing chamber evaporator fan for a set time period so as to change a phase of a refrigerant remaining in the freezing chamber evaporator from liquid to gas, and to utilize a cooling capability remaining in the freezing chamber evaporator so as to maintain a freezing chamber temperature within a predetermined temperature range when the compressor is stopped; and extending operation of a condenser fan from a point when the compressor is stopped to a point when a pressure equilibrium is established between an outlet and an inlet of the compressor, or a lower point close thereto, so as to drop a temperature of a refrigerant discharged from the outlet of the compressor when the pressure equilibrium is established between the outlet and inlet of the compressor, and to introduce the refrigerant into the freezing chamber evaporator or the refrigerating chamber evaporator in a low temperature state.

9. A method for controlling a power saving operation of a refrigerator with two evaporators, in which the refrigerator carries out a RF cycle for sequential operation of a compressor, a condenser, a refrigerating chamber evaporator, and a freezing chamber evaporator, and a F cycle for sequential operation of the compressor, the condenser, and the freezing chamber evaporator, the method comprising extending operation of a refrigerating chamber evaporator fan for a set time period, so as to utilize a cooling capability remaining in the refrigerating chamber evaporator and maintain a refrigerating chamber temperature within a predetermined temperature range when the RF cycle operation is stopped.

10. The method as claimed in claim 9, wherein the set time period is from a point when the RF cycle operation is stopped to a point when a temperature of a refrigerant in the refrigerating chamber evaporator is higher than a predetermined refrigerating chamber temperature, or a lower point close thereto.

11. The method as claimed in claim 9, further comprising extending operation of a condenser fan from a point when the compressor is stopped to a point when a pressure equilibrium is established between an outlet and an inlet of the compressor, or a lower point close thereto, so as to drop a temperature of a refrigerant discharged from the outlet of the compressor when the pressure equilibrium is established between the outlet and inlet of the compressor, and to introduce the refrigerant into the freezing chamber evaporator or the refrigerating chamber evaporator in a low temperature state.

12. A method for controlling a power saving operation of a refrigerator with two evaporators, in which the refrigerator carries out a RF cycle for sequential operation of a compressor, a condenser, a refrigerating chamber evaporator, and a freezing chamber evaporator, and a F cycle for sequential operation of the compressor, the condenser, and the freezing chamber evaporator, the method comprising extending operation of a condenser fan when the compressor is stopped for a set time period, so as to drop a temperature of a refrigerant discharged from an outlet of the compressor and introduce the refrigerant into the freezing chamber evaporator or the refrigerating chamber evaporator in a low temperature state.

13. The method as claimed in claim 12, wherein the set time period is from a point when the compressor is stopped to a point when a pressure equilibrium is established between an outlet and an inlet of the compressor, or a lower point close thereto.

14. A method for controlling a power saving operation of a refrigerator with two evaporators, in which the refrigerator carries out a RF cycle for sequential operation of a compressor, a condenser, a refrigerating chamber evaporator, and a freezing chamber evaporator, and a F cycle for sequential operation of the compressor, the condenser, and the freezing chamber evaporator, the method comprising:

stopping operation of a freezing chamber evaporator fan from initial operation of the RF cycle to a point when a temperature of a refrigerant in the freezing chamber evaporator is below a predetermined freezing chamber temperature, or a higher point close thereto;

extending operation of the freezing chamber evaporator fan from a point when the compressor is stopped to a point when a temperature of the refrigerant in the freezing chamber evaporator is higher than the predetermined freezing chamber temperature, or a lower point close thereto; and extending operation of a refrigerating chamber evaporator fan point when the RF cycle operation is stopped to a point when a temperature of the refrigerant in the refrigerating chamber evaporator is higher than a predetermined refrigerating chamber temperature, or a lower point close thereto.

15. A method for controlling a power saving operation of a refrigerator with two evaporators, in which the refrigerator carries out a RF cycle for sequential operation of a compressor, a condenser, a refrigerating chamber evaporator, and a freezing chamber evaporator, and a F cycle for sequential operation of the compressor, the condenser, and the freezing chamber evaporator the method comprising:

stopping operation of a freezing chamber evaporator fan from a point of initial operation of the RF cycle to a point when a temperature of a refrigerant in the freezing chamber evaporator is below a predetermined freezing chamber temperature, or a higher point close thereto;

extending operation of the freezing chamber evaporator fan from a point when the compressor is stopped to a point when a temperature of the refrigerant in the freezing chamber evaporator is higher than the predetermined freezing chamber temperature, or a lower point close thereto; and extending operation of a condenser fan from a point when the compressor is stopped to a point when a pressure equilibrium is established between an outlet and an inlet of the compressor, or a lower point close thereto.

16. A method for controlling a power saving operation of a refrigerator with two evaporators, in which the refrigerator carries out a RF cycle for sequential operation of a compressor, a condenser, a refrigerating chamber evaporator, and a freezing chamber evaporator, and a F cycle for sequential operation of the compressor, the condenser, and the freezing chamber evaporator, the method comprising:

stopping operation of a freezing chamber evaporator fan from an initial point of operation of the RF cycle to a point when a temperature of a refrigerant in the freezing chamber evaporator is below a predetermined freezing chamber temperature, or a higher point close thereto;

extending operation of a refrigerating chamber evaporator fan from a point when the RF cycle operation is stopped to a point when a temperature of a refrigerant in the refrigerating chamber evaporator is higher than a predetermined refrigerating chamber temperature, or a lower point close thereto; and extending operation of a condenser fan from a point when the compressor is stopped to a point when a pressure equilibrium is established between an outlet and an inlet of the compressor, or a lower point close thereto.

17. A method for controlling a power saving operation of a refrigerator with two evaporators, in which the refrigerator carries out a RF cycle for sequential operation of a compressor, a condenser, a refrigerating chamber evaporator, and a freezing chamber evaporator, and a F cycle for sequential operation of the compressor, the condenser, the freezing chamber evaporator the method comprising:

extending operation of the freezing chamber evaporator fan from a point when the compressor is stopped to a point when a temperature of a refrigerant in the freezing chamber evaporator is higher than a predetermined freezing chamber temperature, or a lower point close thereto;

extending operation of refrigerating chamber evaporator fan from a point when the RF cycle operation is stopped to a point when a temperature of a refrigerant in the refrigerating chamber evaporator is higher than a predetermined refrigerating chamber temperature, or a lower point close thereto; and extending operation of a condenser fan from a point when the compressor is stopped to a point when a pressure equilibrium is established between an outlet and an inlet of the compressor, or a lower point close thereto.

18. A method for controlling a power saving operation of a refrigerator with two evaporators, in which the refrigerator carries out a RF cycle for sequential operation of a compressor, a condenser, a refrigerating chamber evaporator, and a freezing chamber evaporator, and a F cycle for sequential operation of the compressor, the condenser, the freezing chamber evaporator the method comprising:

stopping a freezing chamber evaporator fan from an initial point of operation of the RF cycle to a point when a temperature of a refrigerant in the freezing chamber evaporator is below a predetermined freezing chamber temperature, or a higher point close thereto;

extending operation of the freezing chamber evaporator fan from a point when the compressor is stopped to a point when a temperature of the refrigerant in the freezing chamber evaporator is higher than a predetermined freezing chamber temperature, or a lower point close thereto;

extending operation of a refrigerating chamber evaporator fan from a point when the RF cycle operation is stopped to a point when a temperature of a refrigerant in the refrigerating chamber evaporator is higher than a predetermined refrigerating chamber temperature, or a lower point close thereto; and extending operation of a condenser fan from a point when the compressor is stopped to a point when a pressure equilibrium is established between an outlet and an inlet of the compressor, or a lower point close thereto.

19. A control method for a refrigerator, wherein the refrigerator performs a RF cycle for operation of a compressor, a condenser, a refrigerating chamber evaporator, and a freezing chamber evaporator of the refrigerator, and performs a F cycle for operation of the compressor, the condenser, and the freezing chamber evaporator of the refrigerator, the method comprising:

delaying initial operation of a freezing chamber evaporator fan for a first time interval so as to suppress a heat exchange effect of the freezing chamber evaporator;

extending an operational period of the freezing chamber evaporator fan for a second interval time period so as to expend a residual cooling capacity contained in the freezing chamber evaporator;

extending an operational period of a refrigerating chamber evaporator fan for a third time interval so as to expend a residual cooling capacity contained in the refrigerating chamber evaporator; and extending an operational period of a condenser fan for a fourth time interval so as to decrease a temperature of a refrigerant discharged from the compressor.

20. The method as claimed in claim 19, wherein the first time interval extends from a point of initial RF cycle operation to a point when a temperature of a refrigerant of the freezing chamber evaporator is lower than a predetermined freezing chamber temperature.

21. The method as claimed in claim 19, wherein the second time interval extends from a point when the compressor is stopped to a point when a temperature of a refrigerant in the freezing chamber evaporator is higher than a predetermined freezing chamber temperature.

22. The method as claimed in claim 19, wherein the third time interval extends from a point when the RF cycle operation is stopped to a point when a temperature of a refrigerant of the refrigerating chamber evaporator is higher than a predetermined refrigerating chamber temperature.

23. The method as claimed in claim 19, wherein the fourth time interval extends from a point when the compressor is stopped to a point when a pressure equilibrium is established between an outlet portion of the compressor and an inlet portion of the compressor.

24. A method for controlling a power saving operation of a refrigerator with two evaporators, in which the refrigerator carries out a RF cycle for sequential operation of a compressor, a condenser, a refrigerating chamber evaporator, and a freezing chamber evaporator, and a F cycle for sequential operation of the compressor, the condenser, and the freezing chamber evaporator, the method comprising:

extending operation of a freezing chamber evaporator fan for a set time period so as to change a phase of a refrigerant remaining in the freezing chamber evaporator from liquid to gas, and to utilize a cooling capability remaining in the freezing chamber evaporator so as to maintain a freezing chamber temperature within a predetermined temperature range when the compressor is stopped; and extending operation of a refrigerating chamber evaporator fan from a point when the RF cycle operation is stopped to a point when a temperature of the refrigerant in the refrigerating chamber evaporator is higher than a predetermined refrigerating chamber temperature, or a lower point close thereto, so as to utilize a cooling capability remaining in the refrigerating chamber evaporator and maintain a refrigerating chamber temperature within a predetermined temperature range when the RF cycle operation is stopped.

* * * * *